Dec. 15, 1931.    L. W. LANGFORD    1,836,671
AUDITING MACHINE
Filed July 23, 1925    11 Sheets-Sheet 1
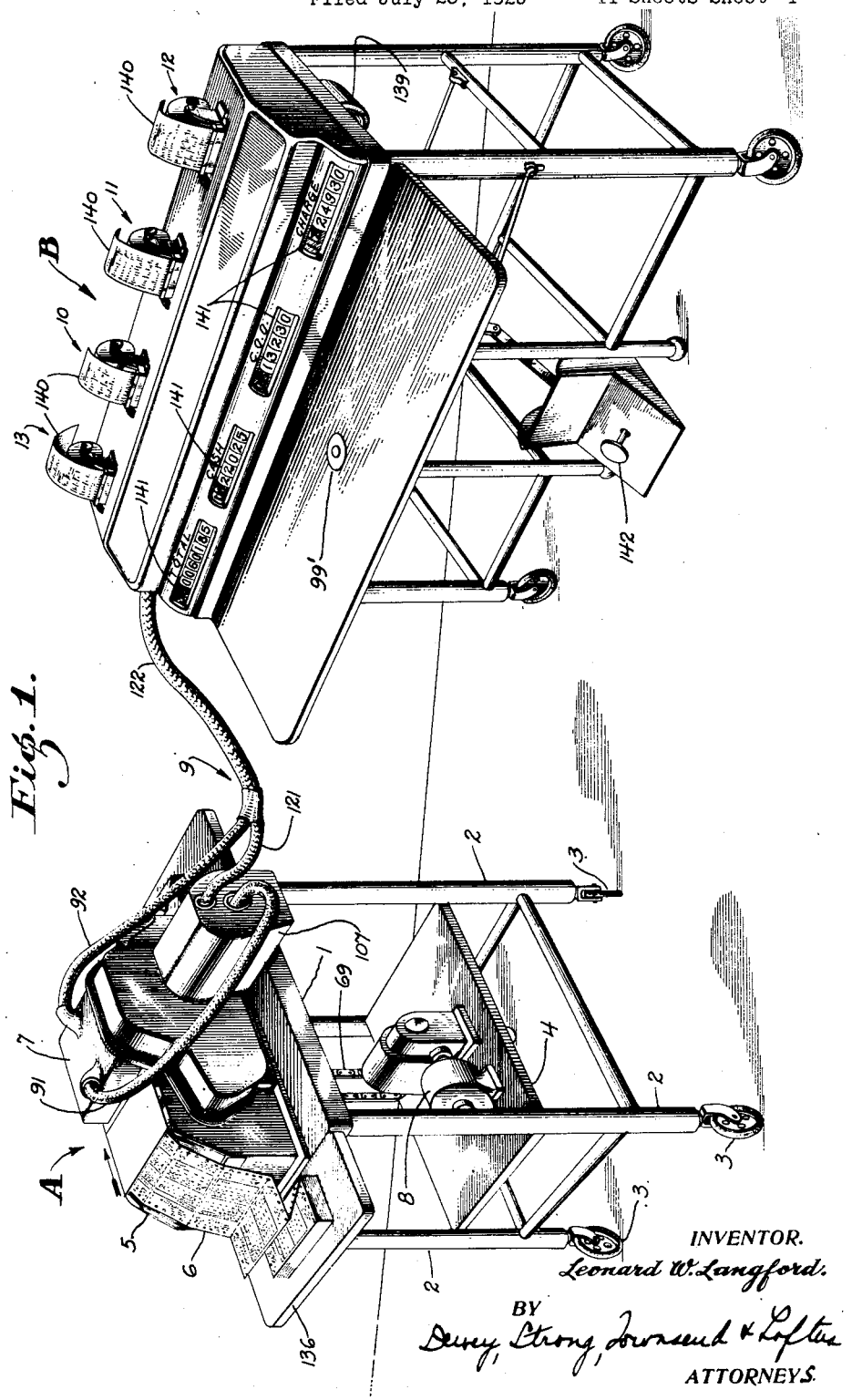
INVENTOR.
Leonard W. Langford.
BY
Dewey, Strong, Townsend & Loftus
ATTORNEYS.

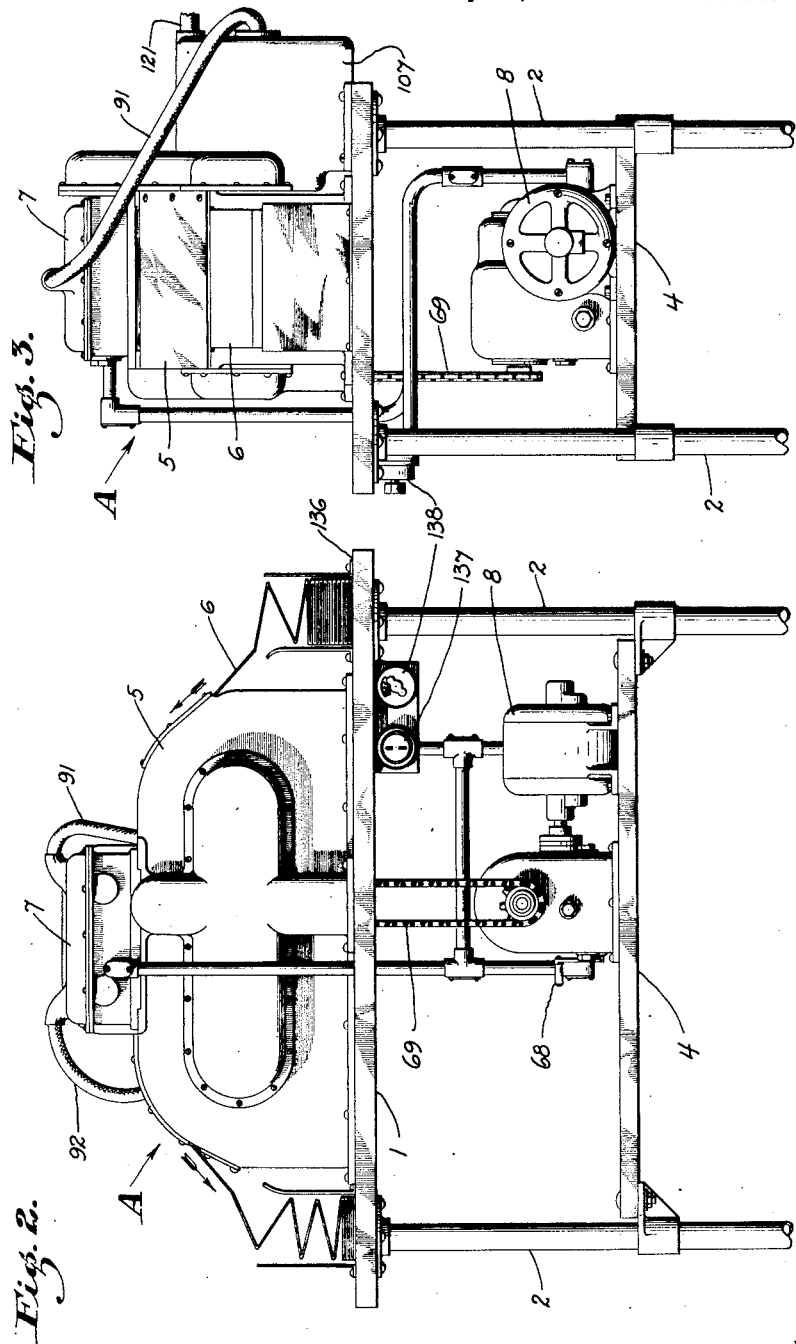

Dec. 15, 1931.  L. W. LANGFORD  1,836,671
AUDITING MACHINE
Filed July 23, 1925   11 Sheets-Sheet 3

INVENTOR.
Leonard W. Langford.
BY
Dewey, Strong, Townsend & Loftus
ATTORNEYS.

Dec. 15, 1931.  L. W. LANGFORD  1,836,671
AUDITING MACHINE
Filed July 23, 1925    11 Sheets-Sheet 4
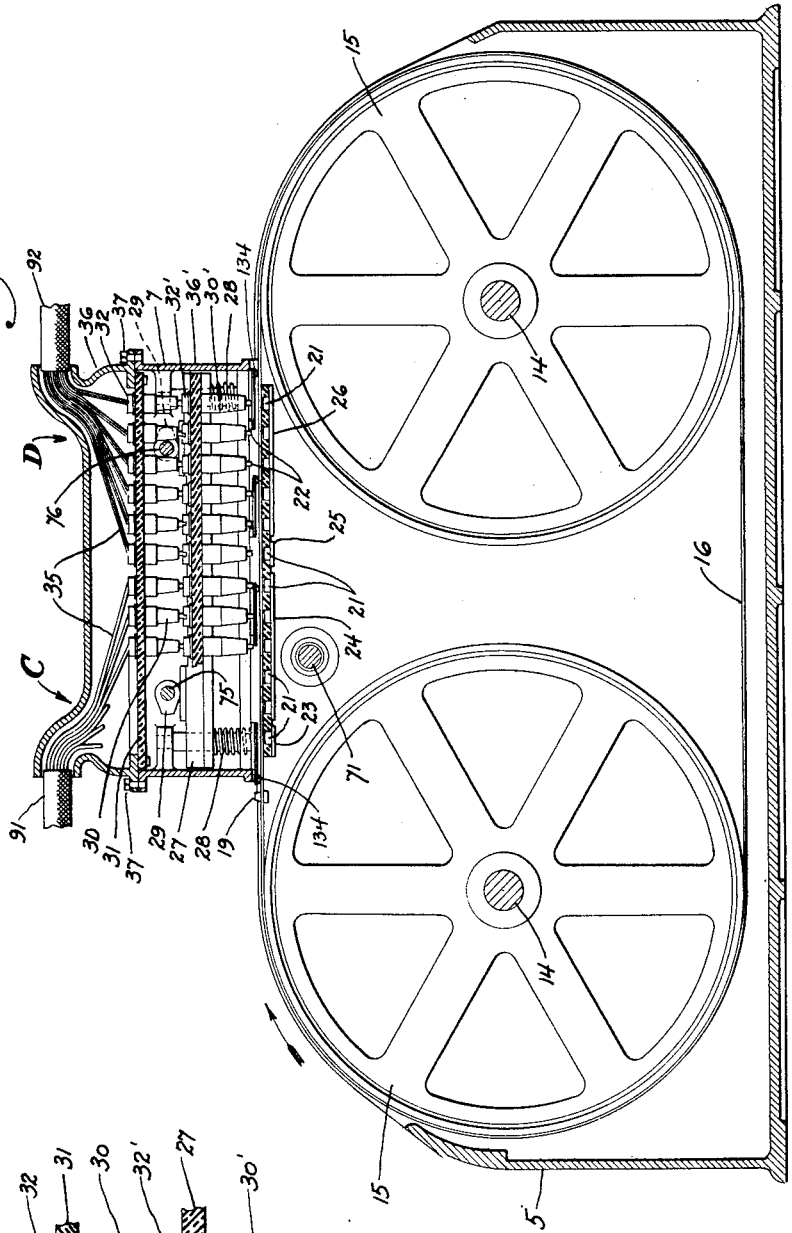
INVENTOR.
Leonard W. Langford.
BY
Dewey, Strong, Townsend & Loftus
ATTORNEYS.

Dec. 15, 1931.   L. W. LANGFORD   1,836,671
AUDITING MACHINE
Filed July 23, 1925   11 Sheets-Sheet 5
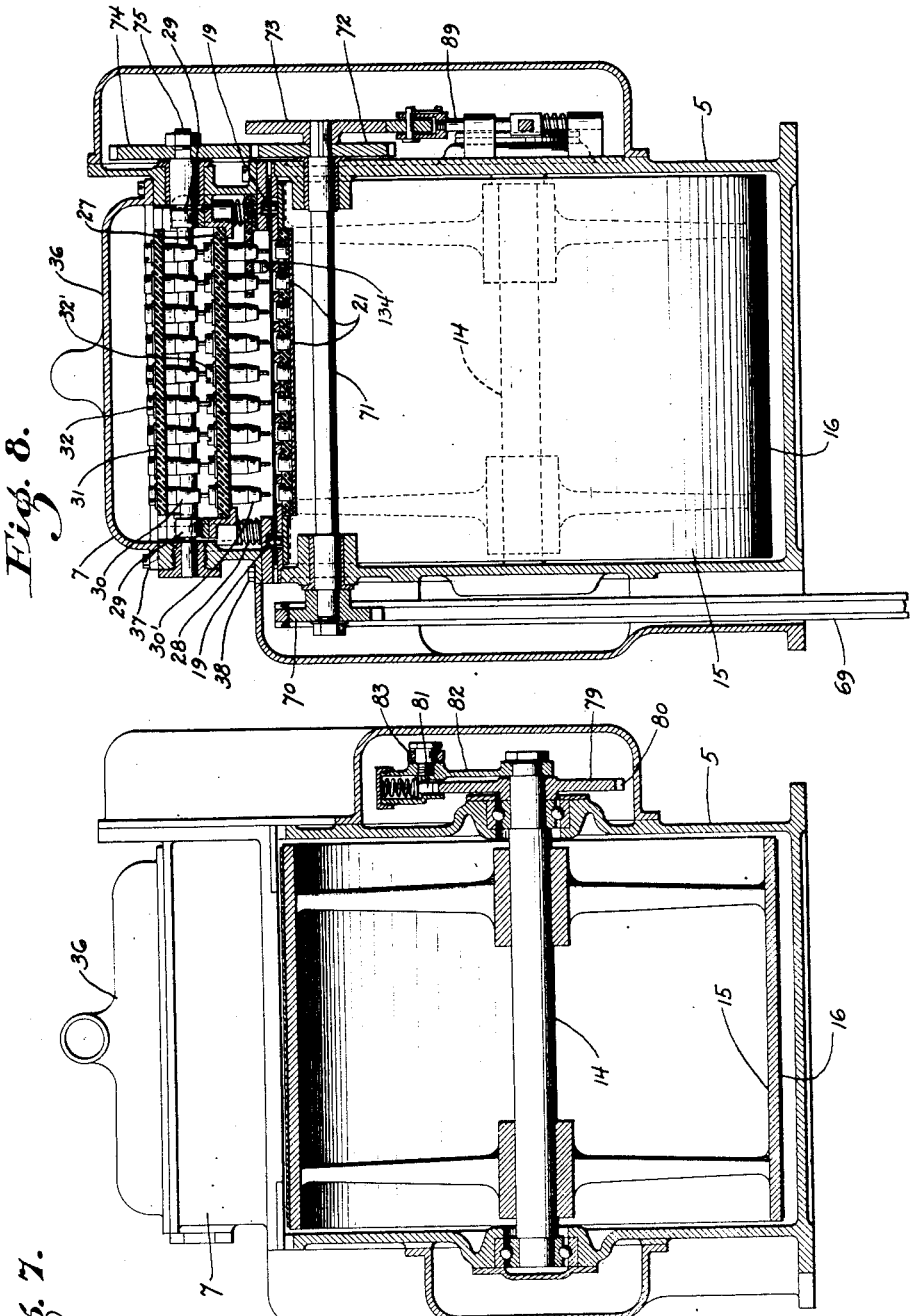
INVENTOR.
Leonard W. Langford
BY
Dewey, Strong, Townsend & Loftus
ATTORNEYS.

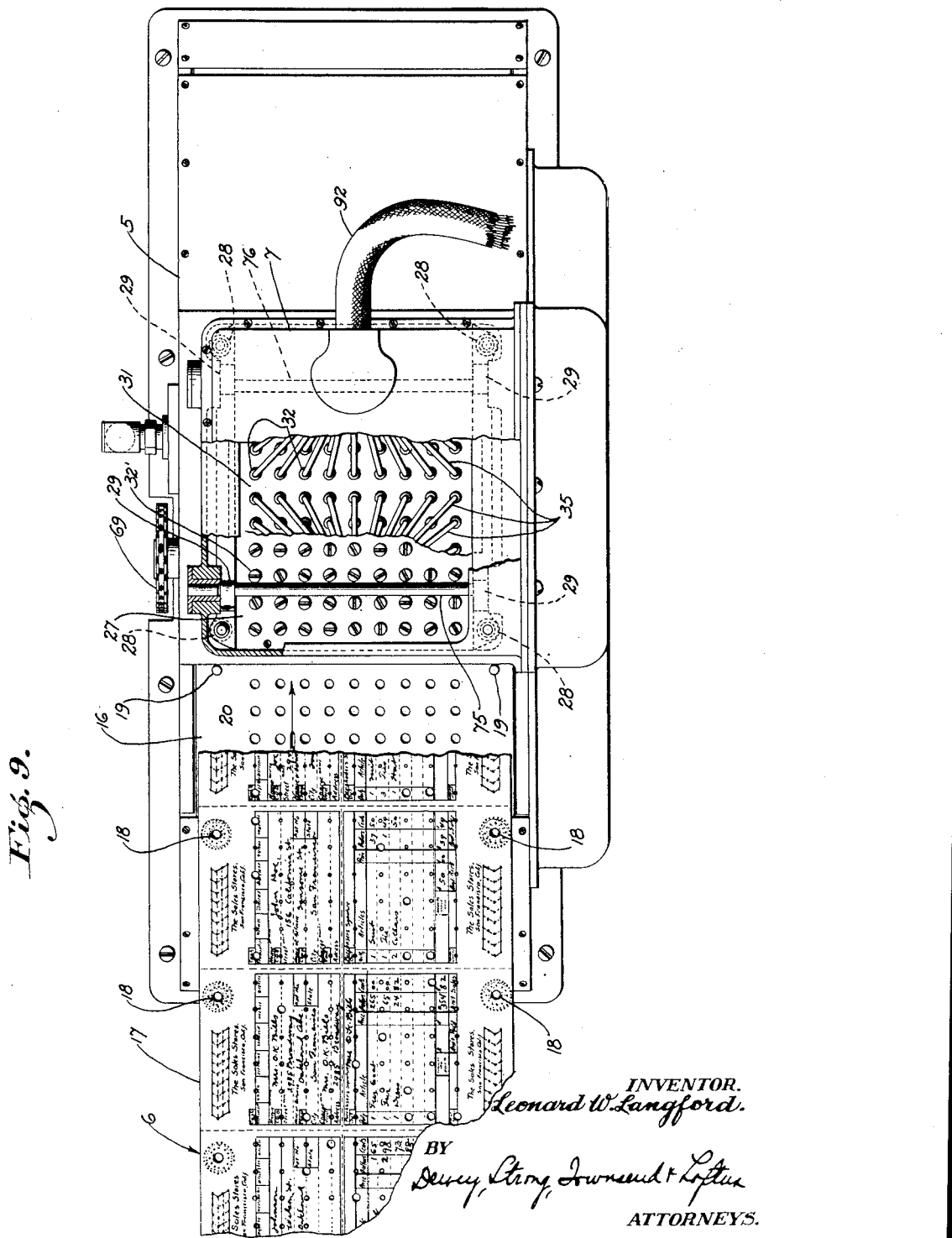

Dec. 15, 1931.  L. W. LANGFORD  1,836,671
AUDITING MACHINE
Filed July 23, 1925   11 Sheets-Sheet 7
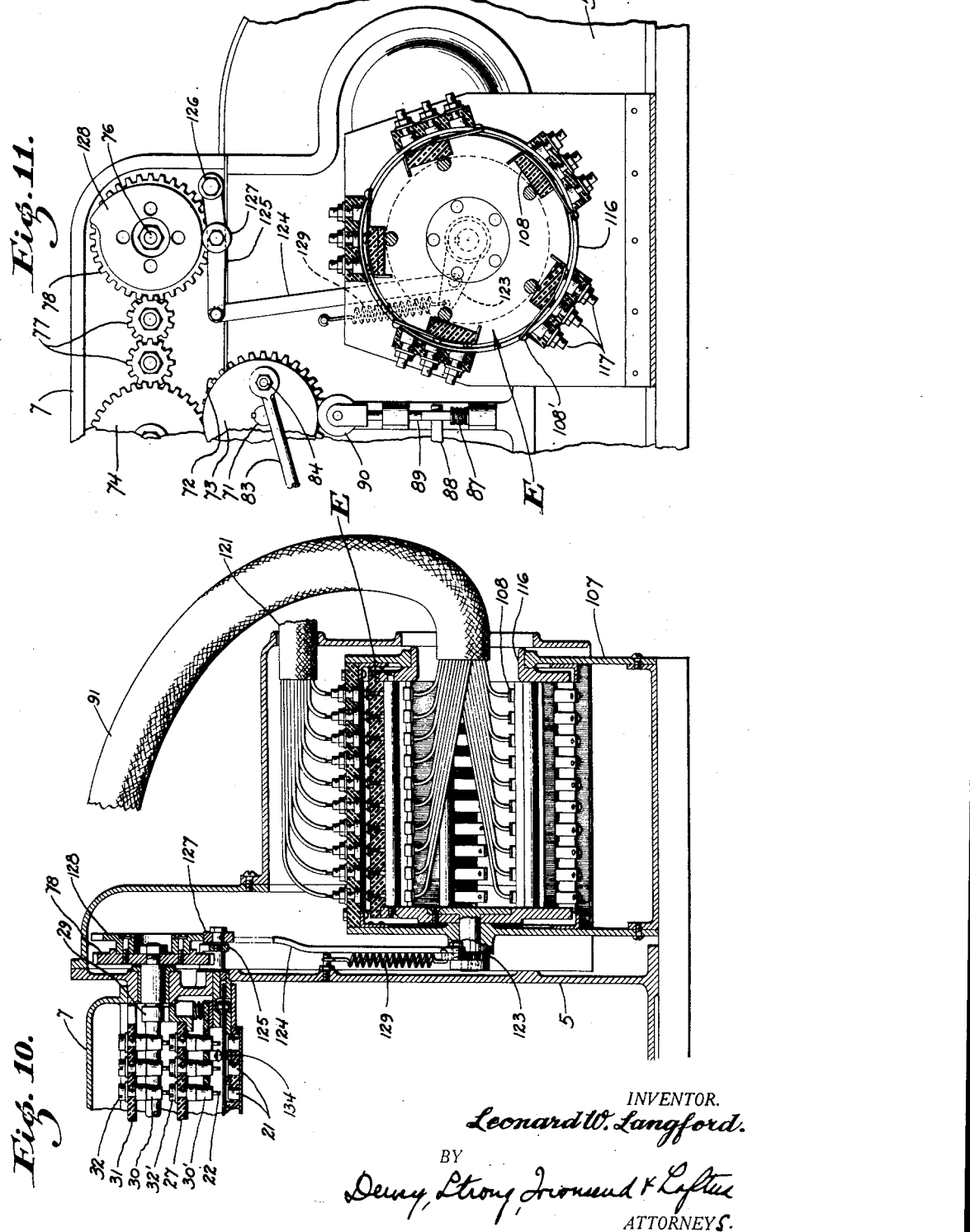
INVENTOR.
Leonard W. Langford.
BY
ATTORNEYS.

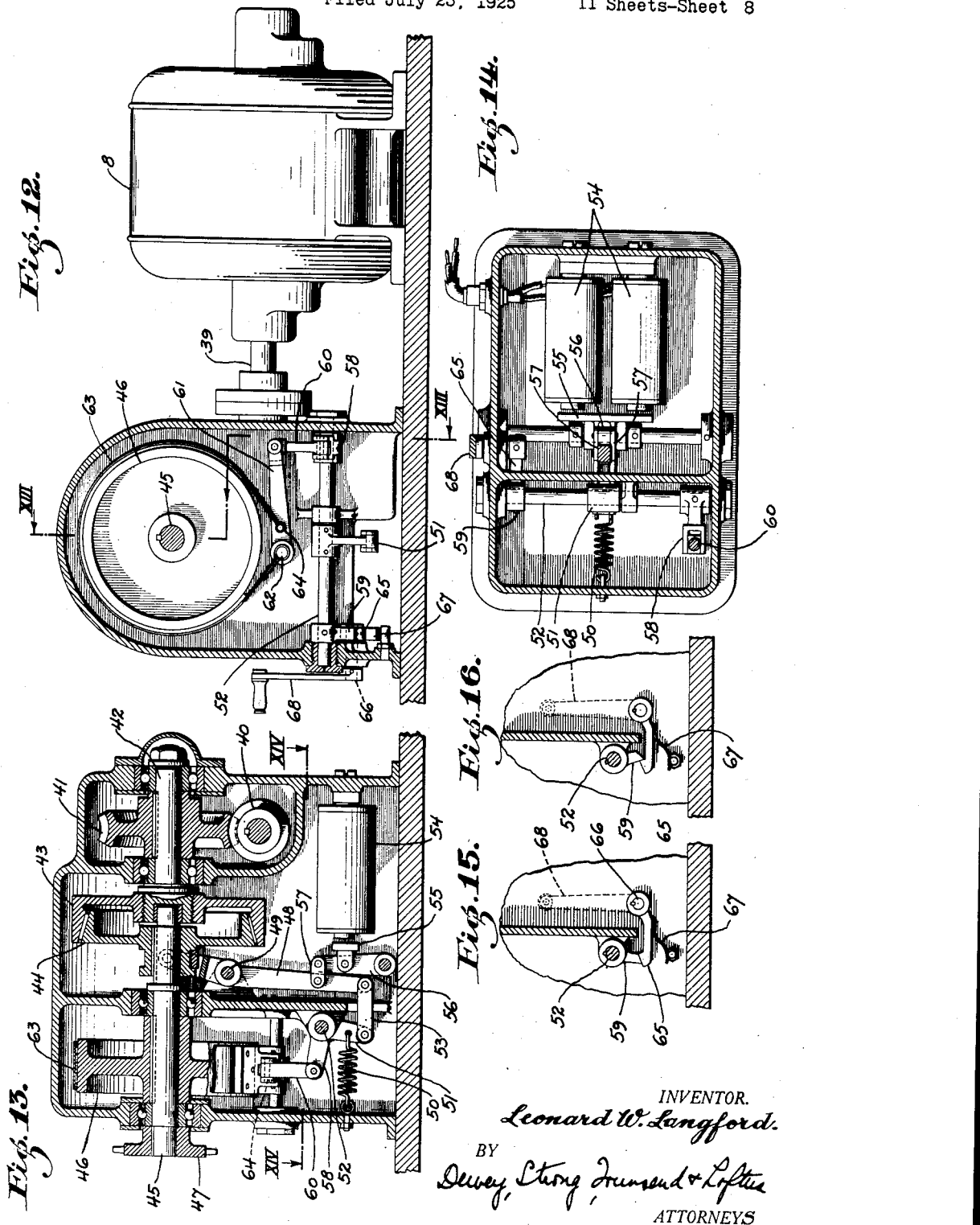

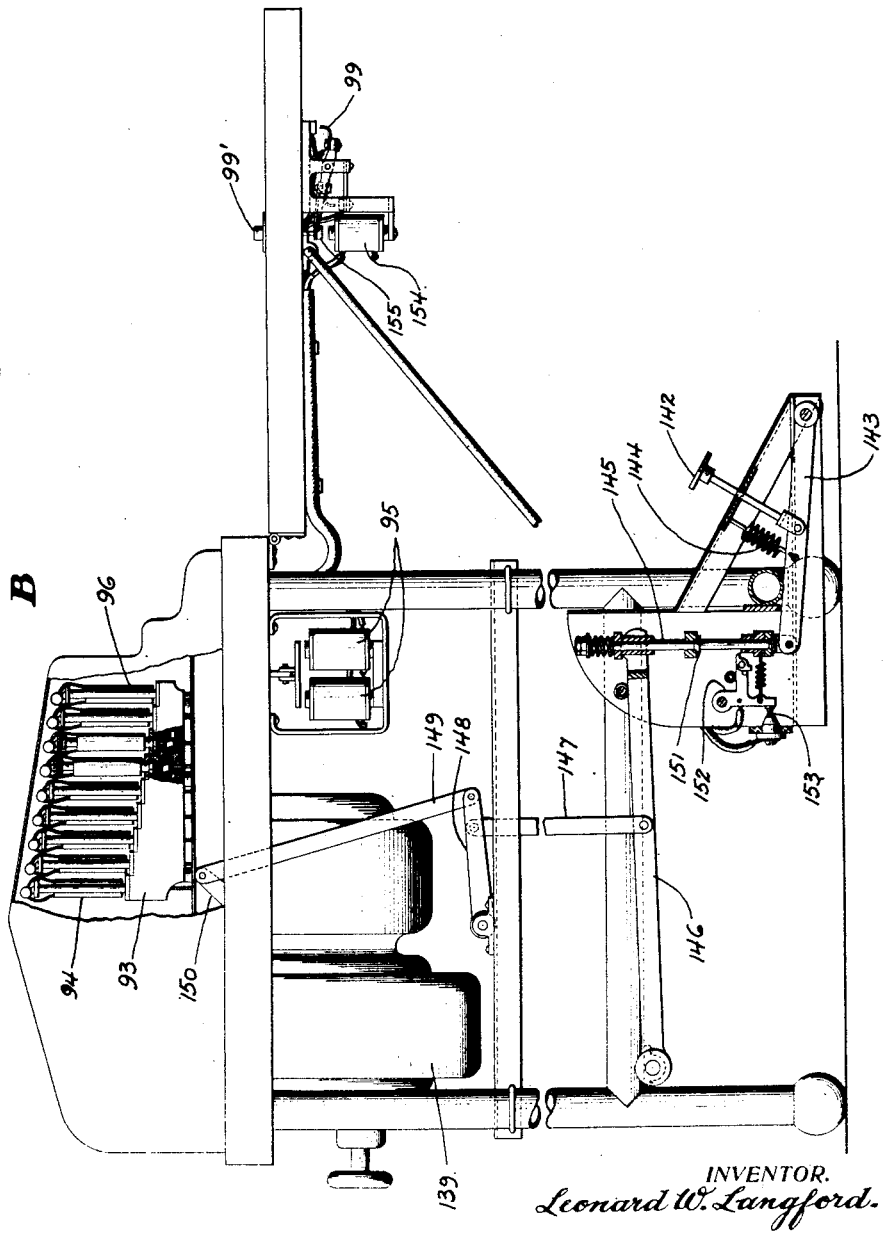

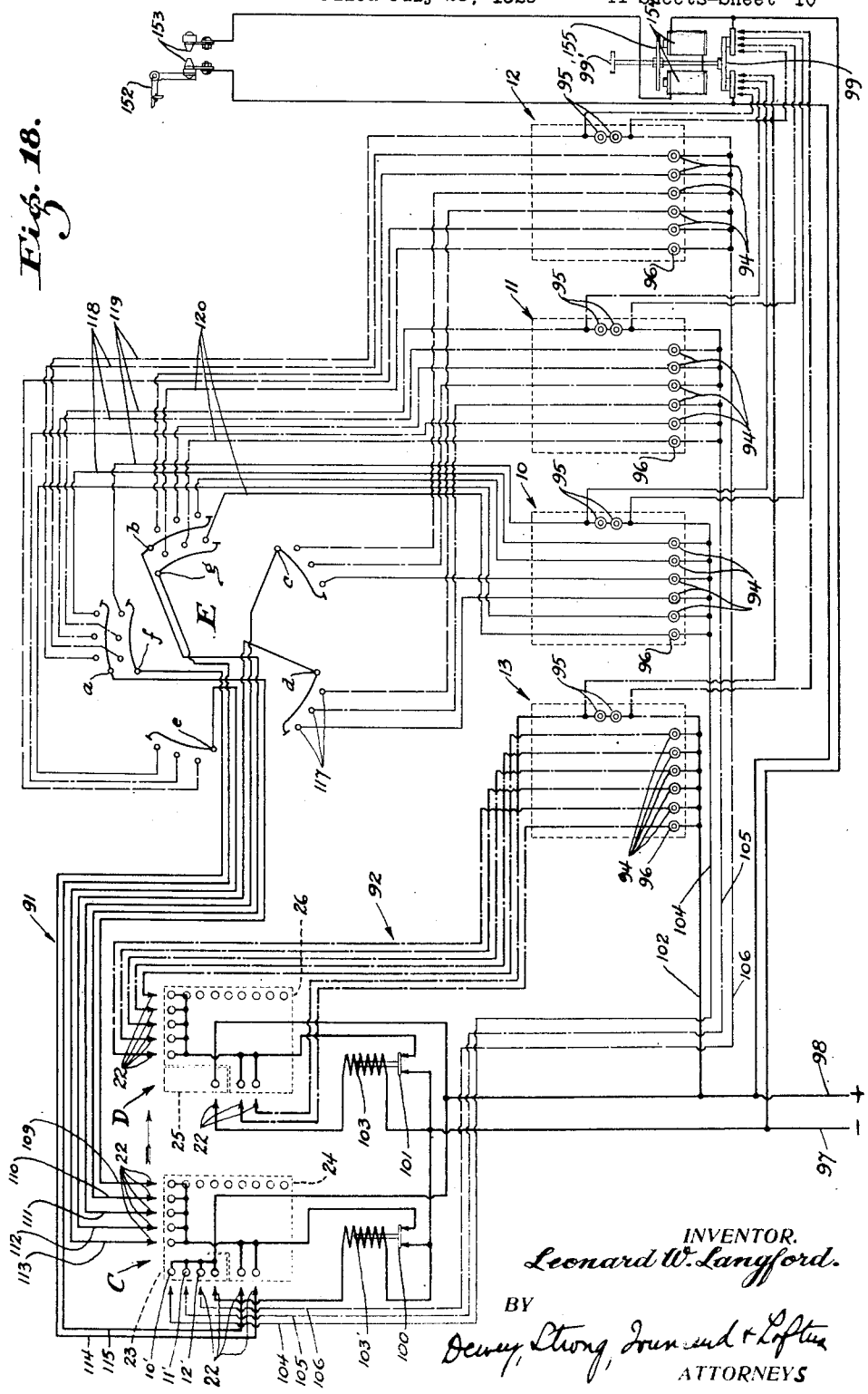

Dec. 15, 1931.   L. W. LANGFORD   1,836,671
AUDITING MACHINE
Filed July 23, 1925    11 Sheets-Sheet 11

INVENTOR.
Leonard W. Langford.
BY
Dewey, Strong, Townsend & Loftus
ATTORNEYS.

Patented Dec. 15, 1931

1,836,671

UNITED STATES PATENT OFFICE

LEONARD W. LANGFORD, OF SAN FRANCISCO, CALIFORNIA, ASSIGNOR TO LANGFORD SALES AUDIT MACHINE COMPANY, OF BOSTON, MASSACHUSETTS, A CORPORATION OF MASSACHUSETTS

AUDITING MACHINE

Application filed July 23, 1925. Serial No. 45,461.

This invention relates to auditing or accounting machines of the type adapted to operate through perforations in punched records to tabulate, add, record and provide desired totals of a plurality of transactions indicated by the location of the punchings in the records. I am aware that this subject-matter is not broadly new and I am therefore not claiming this invention broadly herein. It is however the primary object of my invention to provide an improved machine of this type.

In my co-pending application, Serial No. 39,405 filed June 25, 1925, I have described an improved method of sales recording and accounting. This method, while not limited to any particular business application, is particularly useful in large department stores. Briefly, the method comprises the making of an autographic record and a punched record of each sale, preferably on the same sales ticket, in one transaction at the time of making the sale and thereafter mechanically operating on the punched records, or duplicate copies thereof, through the perforations therein, to audit the sales.

In practice, each clerk or salesman is provided with a sales recording device comprising a combined writing platen and punch press. Such a device is illustrated and described in several forms in co-pending applications, Serial No. 639,988, filed May 18, 1923; Serial No. 666,255, filed October 3, 1923; Serial No. 757,697, filed December 23, 1924, and Serial No. 51,297 filed August 20, 1925. These records are made in duplicate or triplicate on this device, the original being given to the customer and a duplicate copy retained in the machine. These retained records or tickets, which are preferably connected in strip form, are thereafter run through my improved auditing machine described herein. This machine, which includes adding and tabulating mechanism, operates automatically on the records through the perforations therein to quickly and accurately provide the complete total data desired.

My improved auditing machine, as illustrated in the accompanying drawings, comprises mechanism adapted to automatically feed perforated paper records therethrough, a plurality of standard adding machines each having a key board, and means operating through and controlled by the perforations in the records for operating the keys of the key boards. It is an object of my invention to provide such an improved mechanism.

Another novel combination comprised within my invention is a plurality of adding mechanisms and a totaling mechanism, means, including controlling means operative through the perforations in the records, to select the adding mechanism to be operated and to set the same to register an amount thereon corresponding to the record perforations, and means setting the totaling mechanism to register a corresponding amount, whereby the adding mechanisms will respectively tabulate and total desired independent transactions and the totaling mechanism will tabulate and total all the transactions. It is a further object of my invention to provide such an improved combination.

The perforated paper records herein referred to are preferably in the form of a continuous strip and it is a further object of my invention to provide an improved auditing machine having means for feeding this strip past a plurality of controlling elements which operate through the perforations in the strip to tabulate and total the transactions thereof on computing mechanism comprising a part of the machine.

Another object of my invention is to provide an improved auditing machine having electric circuit means, including contacts adapted to operate through the paper record perforations, to select the adding mechanism to be operated in accordance with the character of the transaction as indicated by a record perforation, and a quick make and break switch mechanism in the circuit connected to all the adding mechanisms and adapted to form a connection to the adding mechanism selected in a manner to set the same to register an amount corresponding to the record perforations.

Other objects accomplished by my invention will become apparent as the description herein proceeds. With all these objects in view, my invention consists in the features of construction and operation set forth in the following specification and illustrated in the accompanying drawings. In such drawings annexed hereto and forming a part of this specification, I have illustrated one specific embodiment of my invention but it will be understood that the invention can be otherwise embodied and that the drawings are not to be construed as defining or limiting the scope of the invention, the claims appended to this specification being relied upon for that purpose.

Referring to the figures of the drawings:

Fig. 1 is a perspective view of my improved auditing machine.

Fig. 2 is a front elevation of the transmitting unit.

Fig. 3 is an end elevation thereof.

Fig. 5 is a view like Fig. 4 but showing the contact box in section.

Fig. 6 is a detail view of the contacts shown in Fig. 5.

Fig. 7 is a vertical sectional view taken on line VII—VII of Fig. 4.

Fig. 8 is a vertical sectional view taken on line VIII—VIII of Fig. 4.

Fig. 9 is a plan view of Fig. 4 with portions thereof partially broken away.

Fig. 10 is a fragmentary view in vertical section through the switch box shown in Fig. 1.

Fig. 11 is a cross section therethrough.

Fig. 12 is an enlarged side elevation partially in section of the driving mechanism shown in Fig. 1.

Fig. 13 is a vertical section therethrough on line XIII—XIII of Fig. 12.

Fig. 14 is a plan section therethrough on line XIV—XIV of Fig. 13.

Figs. 15 and 16 are detail views showing latch mechanism in two positions.

Fig. 17 is an elevation of the tabulating and adding unit, partially in section.

Fig. 18 is a wiring diagram of the electrical connections.

Figure 4:
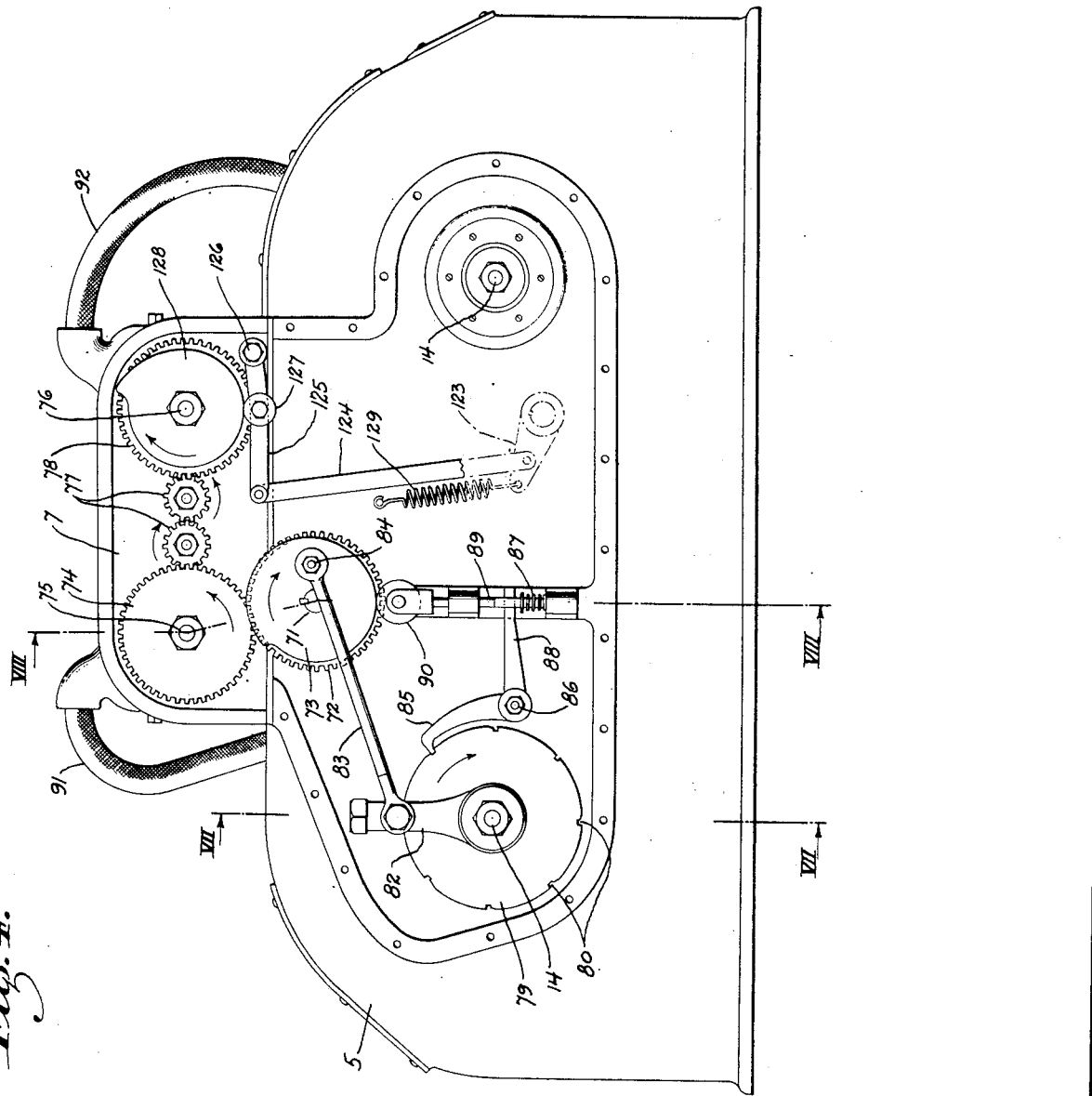
Fig. 4 is an enlarged elevation of the opposite side of the upper portion of Fig. 2, the cover plate being removed.

As illustrated in the drawings, my improved auditing machine comprises two units, namely, a transmitting unit A and a receiving unit B, although it will be obvious that the same can be constructed as a unitary machine if desired.

The transmitting unit A comprises a top support 1 carried by legs 2 portably mounted on casters 3, a shelf 4 also being supported by the legs. Mounted on the top 1 and housed within a box 5 is a mechanism for feeding a continuous record strip 6 past a set of controlling elements housed within a box 7. The mechanism is driven by a motor 8 and cooperating mechanism supported on the shelf 4.

The controlling elements within the box 7 comprise a plurality of electric contacts which operate through perforations in the record strip and through wires within a cable 9 to transmit the data indicated by the perforations to recording mechanism within the receiving unit B. This unit, as illustrated, comprises four standard adding machines at 10, 11, 12, and 13. As indicated, the adding machine 10 is adapted to tabulate and total the cash sales, the machine 11 the C. O. D. sales, the machine 12 the charge sales, and the machine 13 all the sales. As hereinafter described, the mechanism is entirely automatic, the desired totals indicated by the record perforations being directly tabulated and recorded by the receiving unit as the record strip is fed through the transmitting unit A.

The details of the mechanism illustrated will now be described:

*Transmitting unit A*

Mounted on axles 14 within the box 5 are a pair of drums 15, carrying an endless perforated record feeding belt 16. The perforated records 17 are preferably in the form of independent tickets connected and fanfolded together in strip form as at 6. The opposite end of each ticket is provided with a perforation 18 therein for engaging over pins 19 on the belt. In this manner the tickets are very accurately positioned over the perforations 20 in the belt, each row of nine punching positions on the ticket being positioned directly over a row of nine perforations 20 corresponding thereto. As shown in Fig. 5, the belt 16 and the strip of tickets thereon passes through the bottom of the box 7. In the machine described herein, the belt is moved intermittently in the direction of the arrow the distance of one ticket. During the pause between such movements the controlling elements within the box operate on the ticket therein to record the data indicated by the punchings therethrough.

As seen in Figs. 5 and 8, the electric contact controlling mechanism operating on the tickets comprises a plurality of stationary contacts 21 beneath the belt 16 and a plurality of co-operating movable contacts 22 above the belt. Several of the contacts 21 are mounted on and connected to plates 23, 24, 25, and 26 hereinafter referred to. The contacts 22 are carried by a vertically movable plate 27 normally held in its upper position by four springs 28. Four cams 29 operate therein to intermittently depress the plate as hereinafter described. An upward continuation of the contacts 22 is provided by elements 30 supported on a stationary plate 31 above the plate 27. The plates 27 and 31 are made of non-conducting material, preferably "bakelite".

The construction of the contact members supported in the plates 27 and 31 is the same, this being illustrated in Fig. 6. Each element 30 is held in the plate by a screw 32. Each contact element 33 is normally held in its down position by a spring 34. The cable terminals 35 are clamped beneath the screw heads 32 and the circuit passes therefrom downwardly to the contacts 22. The springs 34 hold the contact elements 33 in contact with the screw heads 32' while permitting free vertical movement of the plate 27. The springs 34' normally hold the contact elements 22 projecting downwardly, but permit the same to be moved upward into their holding elements 30'.

The arrangement of these parts is such as to permit the same to be readily assembled and disassembled. The plate 31 and its contact members are carried by the cover portion 36 of the box, the same being secured to the lower portion 36' thereof by bolts 37. By removing the bolts 37, this entire unit can be taken off. The lower portion 36' with the plate 27 and contact members may in like manner be bodily removed from the box 5 by removing the bolts 38.

*Transmitting unit driving mechanism*

The shaft 39 of the motor 8 carries a worm 40 in mesh with a worm gear 41 on a shaft 42 also carrying the outer element 43 of a friction clutch. The inner element 44 of this clutch is slidably keyed to a coaxial shaft 45 also carrying a brake drum 46 and a sprocket gear 47 thereon. The clutch is adapted to be shifted by a lever 48 pivoted at 49, the clutch being normally held in the closed position by a spring 50 connected to an arm 51 on a shaft 52, the arm being connected to the lever by a link 53. The clutch is adapted to be opened by a pair of electromagnets at 54 (Figs. 13, 14, and 19) operating on an armature 55 connected to a lever 56 in turn connected by a link 57 to the clutch lever arm 48. The means controlling the operation of the electromagnets is hereinafter described.

The arm 51, a brake operating arm 58 and a latch engaging arm 59 are all mounted on the shaft 52. The arm 58 is connected by a link 60 to a lever 61 pivoted at 62. A brake band 63 surrounding the brake drum 46 has its ends secured to the pivot 62 and a pin 64, whereby downward movement of the lever tightens the band onto the drum to stop the machine when the clutch is disengaged. The arm 59 is adapted to be engaged by a latch hook 65 on a shaft 66. A spring 67 normally holds the hook in engagement with the arm. The arm can be released by a handle 68 on the shaft 66 when it is desired to start the machine, the spring 50 thereupon operating to throw in the clutch.

A chain 69 connects the sprocket 47 with a sprocket 70 on a shaft 71 in the box 5 (Fig. 8). The gear 72 and a cam disc 73 are carried by the opposite end of the shaft 71. The gear 72 is in mesh with a like gear 74 on a shaft 75 connected to a like shaft 76 by intermediate pinions 77 and a gear 78. The plate depressing cams 29 are carried on the shafts 75 and 76.

The belt 16 is moved intermittently by a crank connection to the disc 73. A disc 79 mounted on one of the axles 14 has a plurality of equally spaced notches 80 in its periphery. A spring pressed one-way pawl 81 is carried by an arm 82 loose on the axle. A link 83 connects this arm with a crank pin 84 on the disc 73 whereby, as the disc is continuously rotated, the arm is oscillated in a manner to intermittently rotate the disc 79 and its axle in the direction of the arrow (Fig. 4). The amount of each rotation is just sufficient to move the belt the distance of one ticket.

The disc 79 is normally held locked in position by a detent 85 pivoted at 86 and engageable within the notches 80, a spring 87 acting on an arm 88 thereof to normally hold the detent engaged with the disc. This spring is carried on a rod 89 connected to the arm 88 and having a roller 90 on its upper end engaging against the eccentric periphery of the disc 73. The arrangement is such that the eccentric periphery of the disc moves the rod downward and withdraws the detent just prior to the rotation of the disc 79, the detent acting at all other times to hold the disc 79 and belt 16 against movement.

By referring to Figs. 8 and 9, it will be noted that there are nine rows of co-operating contacts extending lengthwise of the belt 16 and, by referring to Fig. 5, it will be seen that there are twelve of such contacts in each row. It will furthermore be noted that the left-hand half C of these contacts (Fig. 5) lead out through a cable 91 and the right-hand half D through a cable 92. These halves are identical and each is adapted to operate on a sales ticket independently of the other. In operation, the ticket strip moves in the direction of the arrow (Fig. 5) in a manner first bringing each ticket beneath the contact half C which then operates thereon. The next succeeding movement of the ticket strip, the width of a ticket, brings such ticket beneath the contact half D which then operates thereon in like manner.

The cable 92 leads to the operating mechanism for the total adding machine 13. As heretofore stated, this machine is a standard adding machine provided with a keyboard 93. Above this keyboard I provide a bank of solenoids 94, one for each key. The arrangement is such that when a solenoid is energized the core thereof is drawn downwardly in a manner depressing its key.

Figures 19, 20:
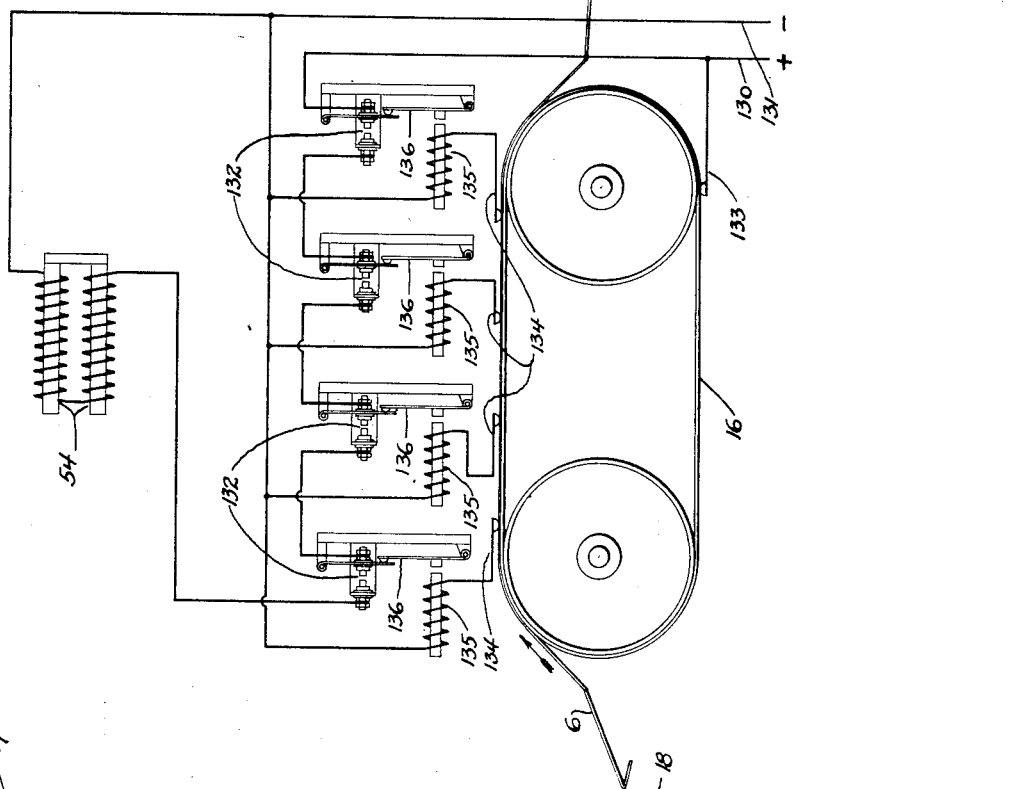
Fig. 19 is a semi-diagrammatic view of automatic stop mechanism.
Fig. 20 is a view of one of the perforated records or tickets on which my machine is adapted to operate.

As illustrated in Figs. 9 and 20, each ticket in the ticket strip has nine rows of punch positions extending transversely thereacross corresponding to the nine rows of contacts extending longitudinally of the machine, there being six rows of such punch positions extending longitudinally of each ticket. The positions in the first right-hand row are numbered 1 to 9 inclusive and indicate cents. The second positions are likewise numbered, and indicate tens of cents. The third indicate dollars, the fourth tens of dollars, and the fifth hundreds of dollars. There are six punch positions in the last transverse row. The first three of these indicate cash, C. O. D., and charge sales and are adapted to select the corresponding adding machine to record the transaction. The fourth indicates a void ticket and a punching in such position is adapted to render the machine inoperative for that ticket. The fifth and sixth positions (indicated as punched in Fig. 20) are adapted to operate the add and item keys of the adding machine selected. The operation of all these features is hereinafter fully described.

It will be understood that each half C and D of the contact mechanism within the box 7 comprises a plurality of co-operating contacts above and below the belt 16, exactly corresponding to the punching positions on each ticket just described. These positions are best illustrated at C and D in Fig. 18. The ticket moves in the direction of the arrow and first enters the position C where it is operated upon by the contacts thereof, the ticket thereafter moving on to the position D where it is again operated upon.

The electrical connections between the transmitting unit A and the receiving unit B are shown diagrammatically in Fig. 18. C and D are the contact halves which co-operate with the perforated tickets. 10, 11, and 12 respectively indicate the cash, C. O. D., and charge adding machines and 13 indicates the total adding machine. A solenoid 94 is provided above each number key of each adding machine and a double solenoid 95 is provided for operating the add key of each machine. The item key of each machine is operated by a solenoid 96. It will be understood that the adding machines are operated electrically and automatically in the usual manner upon the depression of these keys. The source of electrical energy to operate the solenoids is indicated at 97 and 98. A switch is provided at 99 for manually operating the solenoids 95 as hereinafter described.

The cash, C. O. D., charge, and void contacts beneath the belt 16 of the contact half C are mounted on the plate 23. Likewise, the void contact beneath the belt of the half D is mounted on the plate 25. These plates are both directly connected to the terminal 98. The remaining contacts beneath the belt are mounted on plates 24 and 26, and these plates are both connected to the terminal 97 through switches 100 and 101. As indicated in Fig. 18, a direct connection is provided through the cable 92 between the upper contacts of the contact mechanism D and the solenoids of the totaling machine 13. An intermediate switch mechanism E, however, is provided, between the upper contacts of the contact mechanism C which co-operate with the plate 24 and the adding machines 10, 11, and 12 for reasons which will hereinafter appear.

As illustrated in Fig. 18, a direct connection is provided from the upper and movable contacts which co-operate with the contacts on the plate 26 to the solenoids of the machine 13 as follows: Contacts 22, wires within cable 92, solenoids 94, wire 102, and terminal 98. A circuit from terminal 97 to terminal 98 is thereby established through D when the plate 27 is depressed and certain of the contacts 22 engage the contacts on the plate 26. It will be understood that each contact is properly connected to the corresponding solenoids 94 whereby keys are automatically depressed on the adding machine corresponding to the punchings in the ticket; also, the add key solenoids 95 and item key solenoids 96 are properly connected to their contacts above the plate 26. The arrangement is such that when the plate 27 is depressed, contacts 22 will be made at D with the plate 26 wherever punchings appear in the ticket. These contacts will energize the proper solenoids 94 to depress the keys corresponding to the amount punched. Punchings through the item and add positions of the ticket will likewise cause the solenoids 95 and 96 to be energized and the machine to function to register the transaction thereon.

The upper void contact 22 over the plate 25 is connected to the terminal 97 through a coil 103 surrounding a core carrying the bar of switch 101. Should the void position in the ticket be punched, a contact would be formed and a current pass through the coil 103. This would lift and disengage the bar from switch 101. The circuit from the plate 26 thus being broken, the registering mechanism would remain entirely inactive and the ticket pass by without registering the same on the adding mechanism. The circuit to the void contact over plate 23 is adapted to operate through a like void 103' to disengage a like switch 100 in like manner. It should be stated that the void contacts 22 are adjusted to a position slightly in advance of the other contacts, whereby, upon the sensing of a void ticket, the switches 100 and 101 will be opened before any other contacts have been made.

As above stated, the terminal 98 is directly connected to the plate 23 carrying the lower cash, C. O. D., charge and void contacts of the contact half C. The co-operating and movable upper elements of the cash, C. O. D. and charge contacts are respectively connected by wires 104, 105, and 106 to the solenoids of the machines 10, 11, and 12 whereby in operating on a ticket only the solenoids of the machine corresponding to the cash, C. O. D. or charge punching will be connected to the plate 23 which carries the remaining lower contacts at C. The wires from the upper movable contacts co-operating therewith pass through the cable 91 to the interior of a box 107 housing the switch E therein. This switch provides a quick make and break contact in the circuits established to the machines in the manner hereinafter described. The purpose of this switch is to avoid sparking between contacts 21—22, it being understood that the switch E does not operate until the contacts 21—22 are made.

As shown in Figs. 1, 10, and 11, and diagrammatically in Fig. 18, the wires leading from the movable contacts at C through the cable 91 are each connected to a contact switch 108 within the box 107. There are five rows of such switches having 10 contacts in each row. The first nine contacts indicating cents are connected to one row $a$ by wires indicated at 109 (Fig. 18). The second nine contacts indicating dimes are connected to another row $b$ by wires 110, the dollar contacts by wires 111 to row $c$, the tens of dollars by wires 112 to row $d$, and the hundreds of dollars by wires 113 to row $e$. The add and item contacts are connected to two of the five extra switches 108 by wires 114 and 115. Only a portion of the wires and switches are illustrated in Fig. 18, it being understood that there is a wire and switch for each movable contact co-operating with the plate 24.

As illustrated in Figs. 10 and 11, the rows of contact switches 108 are carried on a rotary frame 116 adapted to be oscillated sufficiently to carry the spring contact point 108' of each switch past three stationary contacts 117 located outside of and adjacent the switches 108. The three contacts 117 of each switch are respectively connected to the three solenoids of the three adding machines 10, 11, and 12 which correspond to the contact 22 connected to that switch. It will be understood that the three wires 118 from each switch 108 at $a$ lead respectively to the corresponding cents column solenoids of the three adding machines. The three wires from each of the switches at $b$, $c$, $d$, and $e$ lead to the remaining four columns in like manner. The three wires 119 from the add switch $f$ lead respectively to the add solenoids 95 and the three wires 120 from the item switch $g$ lead to the item solenoids 96 in like manner. All the wires leading from the switch contacts 117 lead outwardly from the box 107 through a cable 121 and with the cable 92 form a cable 122 leading into the receiving unit B.

The frame 116 is adapted to be oscillated in synchronism with the operation of the machine by the following mechanism: An arm 123 secured to the frame 116 is connected by a link 124 to an arm 125 pivoted at 126. A roller 127 on the arm 125 rides on the eccentric periphery of a disk 128 on the shaft 76. A spring 129 keeps the roller in engagement with the disc periphery. The arrangement is such that as the shaft 76 rotates the switch frame 116 and the rows of switches supported thereby will be oscillated to move the switch contact points 108' past their co-operating stationary contacts 117.

The clutch opening electro-magnets 54 above referred to are controlled by the mechanism shown semi-diagrammatically in Fig. 19. A source of electrical energy is provided by terminals 130 and 131. Wires from these terminals lead through solenoids 54 and in series through four normally broken contacts 132. Another circuit is established from these terminals through the belt 16. A contact 133 connects the terminal 130 with the belt. Contacts 134 connect terminal 131 with the belt through magnetic coils 135. Each coil is adapted to attract a pivoted armature 136 in a manner to close the contacts 132. The arrangement is such that, when the elements 134 are all in contact with the belt, the contacts 132 are all held closed. A circuit is thereby established through the solenoids 54, the armature 55 attracted, and the clutch 44 opened. It will be obvious that when a ticket 17 is between any one of the contacts 134 and the belt the circuit to the solenoids 54 is broken at 132 and the clutch is held in closed position by the spring 50. When operations on a ticket strip are completed and the same leaves the belt 16, the contacts 134 engage the belt, energize the coils 135, and automatically stop the machine by opening the clutch 44. At least that portion of the feed belt 16 engaged by the contacts 134 is of a conductive material.

The operation of the mechanism as thus far described is as follows: The strip 6 of the tickets to be operated on, preferably in fan-folded form, is placed on a shelf 136 and the end thereof inserted between the first contact 134 and the belt 16, the perforations 18 being engaged over the pins 19 on the belt. The electric supply circuit being plugged as at 137, the operator throws on the main switch at 138. The motor thereupon operates the mechanism through the clutch 44 which is held closed by the spring 50. The drive is through the chain 69 and shaft 71.

Rotation of the disc 73 operates through the crank link 83 and arm 82 to intermittently rotate the drums 15 and move the belt 16 the distance of one ticket. The drums and belt are normally held in locked position by the detent 85, the eccentric periphery of the disc 73 operating to release the detent just prior to the rotation of the disc 79. It will be understood that the shafts 75 and 76 are continuously rotated. The cams 29 are so located on these shafts as to depress the movable contact plate 27 during the idle movement of the arm 82 and while the belt is stationary.

Upon depressing the plate 27, the upper contacts 22 thereof are brought to bear upon their corresponding lower contacts 21. Wherever a perforation appears in the ticket a contact will be formed, it being understood that the mechanism accurately positions each ticket between the contacts and that the location of the contacts 21 and 22 exactly correspond with the punching locations on the tickets. Each ticket is first operated upon by the contacts at C which control the operation of the adding machines 10, 11, and 12. Upon the next movement of the belt this ticket is passed on to a position between the contacts at D. It will be understood that, as herein described, each ticket represents a cash, C. O. D. or charge sale, and each ticket is therefore perforated in one of such positions. The ticket is furthermore punched to indicate the amount of the sale. When the plate 27 is depressed on a ticket at C, contacts are made through these perforations. The contact through the cash, C. O. D. or charge perforation, indicated at 10', 11', and 12', connects the terminal 98 with the solenoids of the corresponding adding machine through one of wires 104, 105, and 106. The terminal 97 is connected with plate 24. Whenever contacts 22 are made with the plate 24, corresponding switches 108 are connected therewith through the wires in cable 91. During the period of such contact, disc 128 operates to oscillate the frame 116 and move the contact points 108' past their corresponding stationary contacts 117. A make and break contact is thereby formed between each switch 108 and the corresponding solenoid of each adding machine 10, 11, and 12, and a circuit is established through the solenoids of the machine having connection with the terminal 98 through one of wires 104, 105, and 106. The solenoids of one of adding machines 10, 11, and 12, corresponding to the punchings on the ticket being operated upon, are thereby energized and operate to depress the corresponding keys. The plate 27 is thereafter raised and the belt operated to advance the ticket strip the distance of one ticket, thus bringing the next adjacent ticket to contacts C and placing the ticket just operated upon by contacts C in position between the contacts D. The plate 27 is then again depressed in like manner. The keys of adding machine 13 corresponding to the ticket punchings are depressed by direct connections through cable 92 in the manner already described.

It will be understood that the adding machines indicated are standard electrically operated machines of well known construction and the details thereof need not therefore be specifically described herein. The machines are all operated by one or more electric motors 139 controlled by the add keys operated by solenoids 95 and by the totaling keys manually operated by mechanism hereinafter described. The add and item positions in each ticket are always punched and therefore the solenoids 95 and 96 of the machine 10, 11, or 12 selected, and of the machine 13 are depressed for each ticket. The solenoids 95 automatically cause the motor or motors to operate the adding machines in the well-known manner whereby the numerals are registered on the machines, recorded on the strips 140 and the totals appear at 141. The solenoids 96 depress the keys which cause the adding machines to automatically total the number of items or tickets audited. As is indicated in Fig. 1, the two left-hand numerals at 141 indicate the number of items added and the remaining numerals indicate the totals thereof.

When the last ticket has run through the machine or whenever it is desired to total the items, the operator depresses the switch button 99', thus closing the switch 99, energizing the solenoids 95 and forming a totaling space. He thereafter depresses the foot pedal 142 which is connected to a lever 143 normally held in raised position by a spring 144. Mechanism comprising a system of rods and levers 145—149 connect the end of the lever 143 with mechanism at 150 adapted to depress the totaling keys of the machines. A shoulder 151 on the rod 145 is adapted to engage a bell crank 152 and close a switch 153, thus energizing solenoids 154 and closing the switch 99 through an armature 155. The machines thereupon operate to record the totals in the usual manner. It will be understood that the records and totals indicated on the strips 140 of the machines 10, 11, and 12, show respectively the cash, C. O. D., and charge sales, and the records and totals of all such sales are indicated on the strip 140 of the machine 13.

It is believed that the operation and use of my invention will be clear without further description herein. A sales ticket as illustrated at 17, preferably in strip form as at 6, is made out autographically and punched for each sale by the sales clerk at the time of making the sale. The total amount punched corresponds to the total of the sale, as $39.49 on the ticket shown in Fig. 20. At the end of each day, these tickets are run through the machine comprising this invention. The machine automatically tabulates and totals the cash, C. O. D., and charge sales respectively on the adding machines 10, 11, and 12, and tabulates and totals all the sales on the adding machine 13. Thus an accurate and complete total record of all data relative to each day's transactions is quickly secured at the end of each day. For a fuller disclosure of this method, reference should be had to Patent Nos. 1,669,766 and 1,669,804. It should be clearly understood, however, that while, as heretofore stated, my invention herein is particularly applicable to sales recording and accounting, the same is not to be understood as limited thereto, for I am fully aware that the field for use of my improved machine is very extensive.

It should be particularly noted that the use of two independent sets of contacts (C and D) provides a check-up for detecting and locating any error made by the machine. In the normal operation of the machine, the sum of the totals of the machines 10, 11, and 12 will be the total of machine 13. It will also be obvious that if the strip 17 fed into the machine contains only one kind of sale (cash, C. O. D. or charge) the tabulated and total results produced by the adding machine selected (10, 11 or 12) would be a duplicate of that produced by the "total" machine 13. If these totals do not correspond, it is obvious that an error has been made.

In the machines now in use wherein is only a single set of contacts, an error can not be detected and if later on it is found that an error has been made the same can be located only by checking back over the entire data until the error is found. Furthermore, if a portion of the machine fails to operate this is not detected readily and the machine will therefore continue operating and making errors until it is found that an error is being made. In my machine, the sum of the totals at 10, 11, and 12 must be equal to the total at 13 at each totaling if the machine is operating correctly. By thus checking up after each totaling operation, any failure in the machine is detected and any error easily located, it being obvious that the error first occurred since the last totaling operation.

Having thus described my invention, what I claim and desire to secure by Letters Patent is:—

1. An auditing machine comprising the combination of a sensing station, mechanism adapted to automatically feed perforated paper records intermittently thereto, a plurality of independent standard adding machines each provided with a key board and operating means, means operative to depress the keys of the key boards, controlling means operative through certain of the perforations in the records to select the adding machine to be operated in accordance with the location of such perforations and on the second mentioned means to depress the keys thereof in accordance with the location of other of the perforations, means acting synchronously with the feeding means for intermittently engaging the controlling means with the records at the sensing station, and means automatically controlling the said operating means in a manner causing the adding machine selected to be operated after the said depression of the keys.

2. An auditing machine comprising the combination of a sensing station, mechanism adapted to automatically feed perforated paper records intermittently thereto, a plurality of independent standard adding machines each provided with a key board and operating means, means operative to depress the keys of the key boards, controlling means operative through the perforations in the records to select the adding machine to be operated and on the second mentioned means to depress the keys thereof in accordance with the location of the perforations, means acting synchronously with the feeding means for intermittently engaging the controlling means with the records at the sensing station, and means controlled by other of the perforations and operative on the said operating means to automatically cause the adding machine selected to be operated after the said depression of the keys.

3. An auditing machine comprising the combination of a sensing station, mechanism adapted to automatically feed perforated paper records intermittently thereto, a plurality of independent standard adding machines each provided with a key board and operating means, a plurality of solenoids respectively operative on the keys of the key boards, electrically controlled means operative through the perforations in the records to select the adding machine to be operated and on the solenoids to depress the keys thereof in accordance with the location of the perforations, means acting synchronously with the feeding means for intermittently engaging the controlling means with the records at the sensing station, and means automatically controlling the said operating means in a manner causing the adding machine selected to be operated after the said depression of the keys.

4. An auditing machine comprising the combination of mechanism adapted to automatically feed perforated paper records therethrough, a plurality of independent standard adding machines each provided with a key board and operating means, means operative to depress the keys of the key boards, controlling means operative through the perforations in the records to select the adding machine to be operated and on the second mentioned means to depress the keys thereof in accordance with the location of the perforations, a totaling machine, means operating thereon to depress the keys thereof corresponding to the keys depressed on the adding machine selected, and means automatically controlling the said operating means in a manner causing the adding machine selected and the totaling machine to be operated after the said depression of the keys, the totaling machine being adapted to tabulate and form a total of all the transactions registered by the adding machine.

5. An auditing machine comprising the combination of mechanism adapted to automatically feed perforated paper records therethrough, a plurality of independent adding mechanisms and a totaling mechanism each provided with recording means, means including controlling means operative through the perforations in the records to select the adding mechanism to be operated and to set the same to register and record an amount corresponding to the record perforations, means setting the totaling mechanism to register and record a corresponding amount, and means automatically causing the adding mechanism selected and the totaling mechanism to be operated to register and record the said amount.

6. An auditing machine comprising the combination of mechanism adapted to automatically feed perforated paper records therethrough, a plurality of independent adding mechanisms and a totaling mechanism, means including controlling means operative through the perforations in the records to select the adding mechanism to be operated and to set the same to register an amount thereon corresponding to the record perforations, other controlling means operative through the record perforations to set the totaling mechanism to register an amount corresponding thereto, and means automatically causing the adding mechanism selected and the totaling mechanism to be operated.

7. An auditing machine comprising the combination of mechanism adapted to automatically feed perforated paper records therethrough, a plurality of independent adding mechanisms and a totaling mechanism, means including electric contact means operative through the perforations in the records to select the adding mechanism to be operated and to set the same to register an amount thereon corresponding to the record perforations, other electric contact means operative through the record perforations to set the totaling mechanism to register an amount corresponding thereto, and means automatically causing the adding mechanism selected and the totaling mechanism to be operated.

8. An auditing machine comprising the combination of mechanism adapted to automatically feed perforated paper records therethrough, a plurality of independent adding mechanisms, electric circuit means having contacts operating through the perforations in the records to select the adding mechanism to be operated, a quick make and break switch mechanism in the circuit connected to all the adding mechanisms and adapted to form a connection to the adding mechanism selected in a manner to set the same to register an amount corresponding to the record perforations, and means thereafter automatically causing the adding mechanism selected to be operated.

9. An auditing machine comprising the combination of mechanism adapted to automatically feed perforated paper records therethrough, a plurality of independent adding mechanisms and a totaling mechanism, electric circuit means having contacts operating through the perforations in the records to select the adding mechanism to be operated, a quick make and break switch mechanism in the circuit connected to all the said adding mechanisms and adapted to form a connection to the adding mechanism selected in a manner to set the same to register an amount corresponding to the record perforations, other means including electric contact means operative through the record perforations to set the totaling mechanism to register an amount corresponding thereto, and means thereafter automatically causing the adding mechanism selected and the totaling mechanism to be operated.

10. A machine of the class described comprising the combination of a continuous perforated support adapted to carry a plurality of perforated paper records thereon, means including a plurality of controlling means operative through the perforations in the support and records to automatically provide a control corresponding to the data indicated by the record perforations, and means for moving the support in a single direction to feed the records past the controlling means.

11. A machine of the class described comprising the combination of a continuous perforated support adapted to carry a plurality of paper records thereon, means including a plurality of controlling elements on opposite sides of the support and operative through the perforations in the support and records to automatically provide a control corresponding to the data indicated by the record perforations, means for intermittently moving the support in a single direction to feed the records past the controlling elements, and means for causing a relative approaching movement of the controlling elements to operate on the record therebetween after each intermittent movement of the support.

12. A machine of the class described comprising the combination of a continuous support adapted to carry a continuous strip of perforated paper records thereon, means including a plurality of controlling elements operative through the perforations in the records to automatically provide a control corresponding to the data indicated by the record perforations, and means for moving the support in a single direction to feed the records past the controlling elements.

13. A machine of the class described comprising the combination of a continuous support adapted to carry a continuous strip of perforated paper records thereon, means including a plurality of electric contact controlling elements operative through the perforations in the records to automatically provide a control corresponding to the data indicated by the record perforations, and means for moving the support in a single direction to feed the records past the controlling elements.

14. A machine of the class described comprising the combination of a continuous support adapted to carry a continuous strip of perforated paper records thereon, a receiving mechanism, electrically operating means therefor, means including a plurality of electric contact controlling elements operative through the perforations in the records to energize the first means to automatically operate the receiving mechanism in a manner corresponding to the data indicated by the record perforations, and means for moving the support in a single direction to feed the records past the controlling elements.

15. A machine of the class described comprising the combination of a continuous support adapted to carry a continuous strip of perforated paper records thereon, projections on the support adapted to engage with the records to properly position the same, means including a plurality of controlling elements operative through the perforations in the records to automatically provide a control corresponding to the data indicated by the record perforations, and means for moving the support in a single direction to feed the records past the controlling elements.

16. A machine of the class described comprising the combination of a continuous support adapted to carry a continuous strip of perforated paper records thereon, means including a plurality of controlling elements operative through the perforations in the records to automatically provide a control corresponding to the data indicated by the record perforations, means for intermittently moving the support in a single direction to consecutively feed the records to the controlling elements, and means for moving the controlling elements toward the support to cause operating contacts thereof through the record perforations after each feeding movement.

17. An auditing machine comprising the combination of a two station support adapted to receive perforated paper records thereon, accounting mechanism, means including a plurality of controlling elements operative through the perforations in the records at one station to select certain of the accounting mechanism and register amounts thereon corresponding to those indicated by the record perforations, means including other controlling elements operating in like manner at the other station to register corresponding amounts on another portion of the mechanism, and means for successively feeding the records to said stations.

18. A machine of the class described comprising the combination of a pair of rotary elements, an endless perforated belt carried thereon and adapted to carry a continuous strip of perforated paper records, means intermediate the two elements and including a plurality of controlling elements adapted to operate through the perforations in the records and belt to automatically provide a control corresponding to data indicated by the record perforations, and means for rotating the belt supporting elements to move the belt and feed the records to the controlling elements.

19. A machine of the class described comprising the combination of a continuous support adapted to carry a continuous strip of perforated paper records thereon, means including a plurality of controlling elements operative through the perforations in the records to automatically provide a control corresponding to data indicated by the record perforations, means for moving the support in a single direction to feed the records to the controlling elements, and means operative on the last said means to automatically stop the operation of the support when the end of the strip passes through the machine.

20. An auditing machine having two relatively adjacent sensing stations, two perforated-record sensing mechanisms respectively at such stations, two accounting mechanisms connected to and adapted to be respectively operated by the said sensing mechanisms, and means for feeding perforated records consecutively to the said stations, the sensing mechanisms being adapted to respectively operate their accounting mechanisms in accordance with the perforations in the records.

21. A checking auditing machine comprising the combination of two relatively adjacent and alike sensing mechanisms for receiving and sensing perforated records, two accounting mechanisms connected to and adapted to be respectively operated by the said sensing mechanisms, and means for feeding perforated records consecutively to the sensing mechanisms, the sensing mechanisms being adapted to respectively operate their accounting mechanisms in accordance with the same perforations in the records in a manner producing duplicate results when the machine is operating correctly.

22. A checking auditing machine comprising the combination of two relatively adjacent and alike sensing mechanisms for receiving and sensing perforated records, accounting mechanism, means cooperating with one of the sensing mechanisms to register on certain of the accounting mechanism amounts corresponding to those indicated by the record perforations, means cooperating with the other sensing mechanism to register corresponding amounts on another portion of the accounting mechanism, and means for feeding the records consecutively to the sensing mechanisms whereby first one and then the other operate on the same perforations therein.

23. A checking auditing machine comprising the combination of two relatively adjacent and alike sensing mechanisms for receiving and sensing perforated records and including a plurality of electric contacts controlled by the perforations therein, means for successively feeding such records thereto, two accounting mechanisms, means connected to and controlled by the said contacts for setting up a predetermined condition on the accounting mechanisms corresponding to the perforations in the record being sensed, and means automatically causing the accounting mechanisms to function after each said set-up condition, the sensing mechanisms being adapted to respectively operate their accounting mechanisms in accordance with the same perforations in the records in a manner producing duplicate results when the machine is operating correctly.

24. A checking auditing machine comprising the combination of two relatively adjacent and alike sensing mechanisms for receiving and sensing perforated records, two independent standard adding machines each provided with a keyboard and operating means, means controlled by the two sensing mechanisms for respectively depressing the keys of the two keyboards in accordance with the perforations in the records, means automatically controlling the said operating means in a manner causing the adding machines to be operated after the said depression of the keys, and means for feeding perforated records consecutively to the sensing mechanisms.

LEONARD W. LANGFORD.